(12) United States Patent
Yokota et al.

(10) Patent No.: US 7,126,768 B2
(45) Date of Patent: Oct. 24, 2006

(54) PROJECTION LENS UNIT

(75) Inventors: Akihiro Yokota, Sano (JP); Takeshi Kobayashi, Sano (JP); Kumajiro Sekine, Sano (JP)

(73) Assignee: Sekinos Co., Ltd., Sano (JP)

( * ) Notice: Subject to any disclaimer, the term of this patent is extended or adjusted under 35 U.S.C. 154(b) by 0 days.

(21) Appl. No.: 10/831,174

(22) Filed: Apr. 26, 2004

(65) Prior Publication Data

US 2004/0228011 A1    Nov. 18, 2004

(30) Foreign Application Priority Data

May 15, 2003    (JP)    ............................. 2003-137335

(51) Int. Cl.
   G02B 7/02    (2006.01)
(52) U.S. Cl. ...................... 359/811; 359/815; 359/819; 359/822; 359/823
(58) Field of Classification Search ................ 359/811, 359/804, 808, 809, 810, 815, 819, 822, 823, 359/829, 826, 827
See application file for complete search history.

(56) References Cited

U.S. PATENT DOCUMENTS

| | | | | |
|---|---|---|---|---|
| 6,425,667 B1* | 7/2002 | Haba et al. | .................. | 353/100 |
| 2004/0061947 A1* | 4/2004 | Fujisawa et al. | ............ | 359/642 |
| 2004/0212904 A1* | 10/2004 | Sekine et al. | ................ | 359/819 |
| 2005/0117900 A1* | 6/2005 | Ohmori et al. | ............. | 396/448 |

FOREIGN PATENT DOCUMENTS

| | | |
|---|---|---|
| JP | 2000-194065 | 7/2000 |
| JP | 2002-040310 | 6/2002 |
| JP | 2002-202451 | 7/2002 |
| JP | 2003-270506 | 9/2003 |
| JP | 2004-054044 | 2/2004 |

* cited by examiner

*Primary Examiner*—Ricky Mack
*Assistant Examiner*—Brandi N. Thomas
(74) *Attorney, Agent, or Firm*—Bacon & Thomas, PLLC

(57) ABSTRACT

A projection lens unit includes a main body; a lens fixed to the main body; and a hood disposed to one end of the main body close to a screen. The hood defines the outermost boundary of a view angle stretching with respect to the center of the lens and includes a light-shielding plate and a light-shielding barrel. When the shielding height of the light-shielding plate and the length of the light-shielding barrel are respectively represented by H and L, the shielding height H and the length L are set so as to satisfy the equation $\tan(\alpha/2)=H/L$, in relation to the view angle $\alpha$. More particularly, these dimensions are set so as to satisfy the condition that the ratio H/L lies in a range from 0.74 to 0.94. The inner surface of the light-shielding barrel is subjected to surface treatment so as to absorb unnecessary light thereby, reflect it thereat, or scatter it thereat. To be more specific, the light-shielding barrel has scattering grooves disposed on the inner surface thereof.

4 Claims, 3 Drawing Sheets

PROJECTION LENS UNIT

CROSS-REFERENCE TO RELATED APPLICATION

This application claims, under 35 USC 119, priority of Japanese Application No. 2003-137335 filed May 15, 2003.

BACKGROUND OF THE INVENTION

1. Field of the Invention

The present invention relates to a projection lens unit for use in a projector or the like in order to project an image or the like from a light source onto a screen, and more particularly, it relates to a projection lens unit provided with improved means for processing unnecessary light.

2. Description of the Related Art

In recent years, in projectors and the like, in accordance with demand for higher precision of an image such as a high vision image, the projected image is required to have stable quality (picture quality). Hence, a projection lens unit is also required to exhibit high performances.

In such a case, there is a problem of a ghost caused by unnecessary light. That is, of light emitted from a cathode ray tube (hereinafter, simply referred to CRT), unnecessary light incident on the outer periphery of a projection lens causes a crescent ghost to be projected onto a screen.

A projection lens which solves the above problem has been disclosed, for example, in Japanese Unexamined Patent Application Publication No. 2000-194065. The projection lens includes a mask provided with an opening having a shape suitable for the shape of an image for shielding unnecessary light. Also, the projection lens includes means for changing the shape of the opening of the mask in accordance with the zooming action thereof. Unfortunately, this approach leads an increased number of components, thereby resulting in a complicated structure and a higher cost.

In view of the above problem, a projection lens unit having a simple structure shown in FIG. 2 and preventing occurrence of a ghost has been proposed.

As shown in FIG. 2, a CRT 1 has a projection lens unit 2 fixed thereto. An image produced by the CRT1 is magnified by the projection lens unit 2 and is then projected onto a screen (not shown).

The projection lens unit 2 is formed by a lens 3, an inner lens barrel 4, and an outer lens barrel 5. The lens 3 is a combination of three lenses consisting of an inside lens 3A, an intermediate lens 3B, and an outside lens 3C, all disposed in and fixed to the inner lens barrel 4.

In order to prevent occurrence of a crescent ghost, the inside lens 3A has a black painted portion 3D disposed along the rim thereof.

The inner lens barrel 4 has a hood 6 disposed on the front thereof, however the hood 6 does not contribute to removing the unnecessary light at all.

In the projection lens unit having the above mentioned structure, the inside lens 3A has the black painted portion 3D disposed along the rim thereof so as to prevent the unnecessary light from being incident thereon, hence a step of a black painting operation is required. That is, an additional working step is needed, thereby leading to a deteriorated working efficiency and an increased manufacturing cost by an amount corresponding to the additional step.

SUMMARY OF THE INVENTION

The present invention has been made so as to solve the above-described problems. Accordingly, it is an object of the present invention to provide a projection lens unit which offers an improved working efficiency and a reduced manufacturing cost by eliminating the step of a black painting operation.

A projection lens unit according to the present invention includes a main body; and at least one lens fixed to the main body. The end of the main body close to a screen is formed along the outermost boundary of a view angle stretching with respect to the center of the lens.

Since the screen-side end of the main body is formed along the outermost boundary of the view angle stretching with respect to the center of the lens, unnecessary light (unnecessary light adversely affecting an image) traveling outside the outermost boundary of the view angle stretching with respect to the center of the lens can be removed by the end of the main body close the screen, thereby preventing occurrence of a ghost and projecting a high-contrast and clear image onto the screen. As a result reliability of the projection unit is improved.

Another projection lens unit according to the second aspect of the present invention includes a main body; at least one lens fixed to the main body; and a hood disposed to the end of the main body close to a screen so as to define the outermost boundary of a view angle stretching with respect to the center of the lens.

Since the hood defining the outermost boundary of the view angle stretching with respect to the center of the lens is disposed to the screen-side end of the main body, unnecessary light traveling outside the outermost boundary of the view angle can be removed by the hood, thereby preventing occurrence of a ghost and projecting a high-contrast and clear image onto the screen.

It is preferable that the hood include a light-shielding plate disposed to the end of the main body close to a screen so as to lie along a plane orthogonal to the optical axis of the lens and having a circular plate shape; and a light-shielding barrel disposed so as to extend from the screen-side end of the main body toward the screen. In addition, when the shielding height of the light-shielding plate and the length of the light-shielding barrel are respectively represented by H and L, it is preferable that the height H and the length L satisfy the equation $\tan(\alpha/2)=H/L$, in relation to the view angle $\alpha$.

Since the hood includes the light-shielding plate and the light-shielding barrel, and the shielding height H of the light-shielding plate and the length L of the light-shielding barrel are set so as to satisfy the equation $\tan(\alpha/2)=H/L$, unnecessary light traveling outside the outermost boundary of the view angle can be removed, thereby preventing occurrence of a ghost and projecting a high-contrast and clear image onto the screen.

It is preferable that the shielding height H of the light-shielding plate and the length L of the light-shielding barrel satisfy the condition that the ratio H/L lies in a range from 0.74 to 0.94.

With the above-mentioned structure, by setting the shielding height H of the light-shielding plate and the length L of the light-shielding barrel so as to satisfy the condition that the ratio H/L lies in a range from 0.74 to 0.94, unnecessary light traveling outside the outermost boundary of the view angle can be removed, thereby preventing occurrence of a ghost and projecting a high-contrast and clear image onto the screen.

The inner surface of the hood is preferably subjected to surface treatment so that unnecessary light is absorbed thereby, reflected thereat, or scattered thereat.

Since the inner surface of the hood is subjected to surface treatment so as to absorb unnecessary light therein, reflect it thereat, or scatter it thereat, unnecessary light traveling outside the outermost boundary of the view angle can be absorbed by, reflected at, or scattered at the inner surface, thereby preventing occurrence of a ghost and projecting a high-contrast and clear image onto the screen.

The hood is preferably divided into a plurality of pieces so as to be disposed in regions of the lens unit through which unnecessary light passes.

The hood divided into a plurality of pieces is mainly disposed in regions of the projection lens unit through which unnecessary light passes. The hood may be disposed only in the regions through which unnecessary light passes or in the entire region including the above regions through which unnecessary light passes. With this hood, unnecessary light traveling outside the outermost boundary of the view angle can be removed so as to prevent occurrence of a ghost, thereby projecting a high-contrast and clear image onto the screen.

DESCRIPTION OF THE PREFERRED EMBODIMENTS

A projection lens unit according to an embodiment of the present invention will be described in detail with reference to the attached drawings. In this description, the projection lens unit is used for a projector by way of example, in the same fashion as in the description of the related art.

Figure 1:
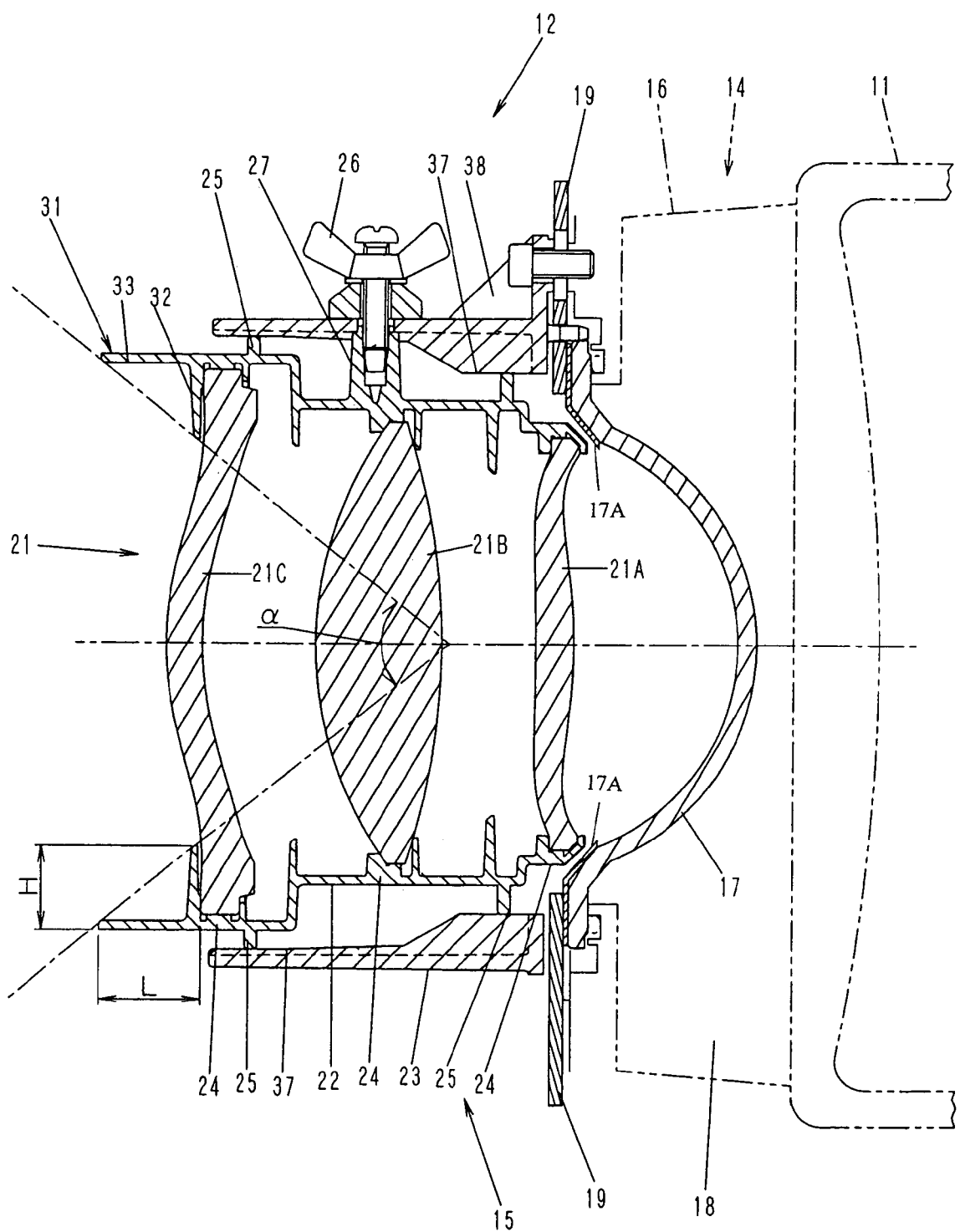
FIG. 1 is a side sectional view of a projection lens unit according to an embodiment of the present invention.
Figure 2:
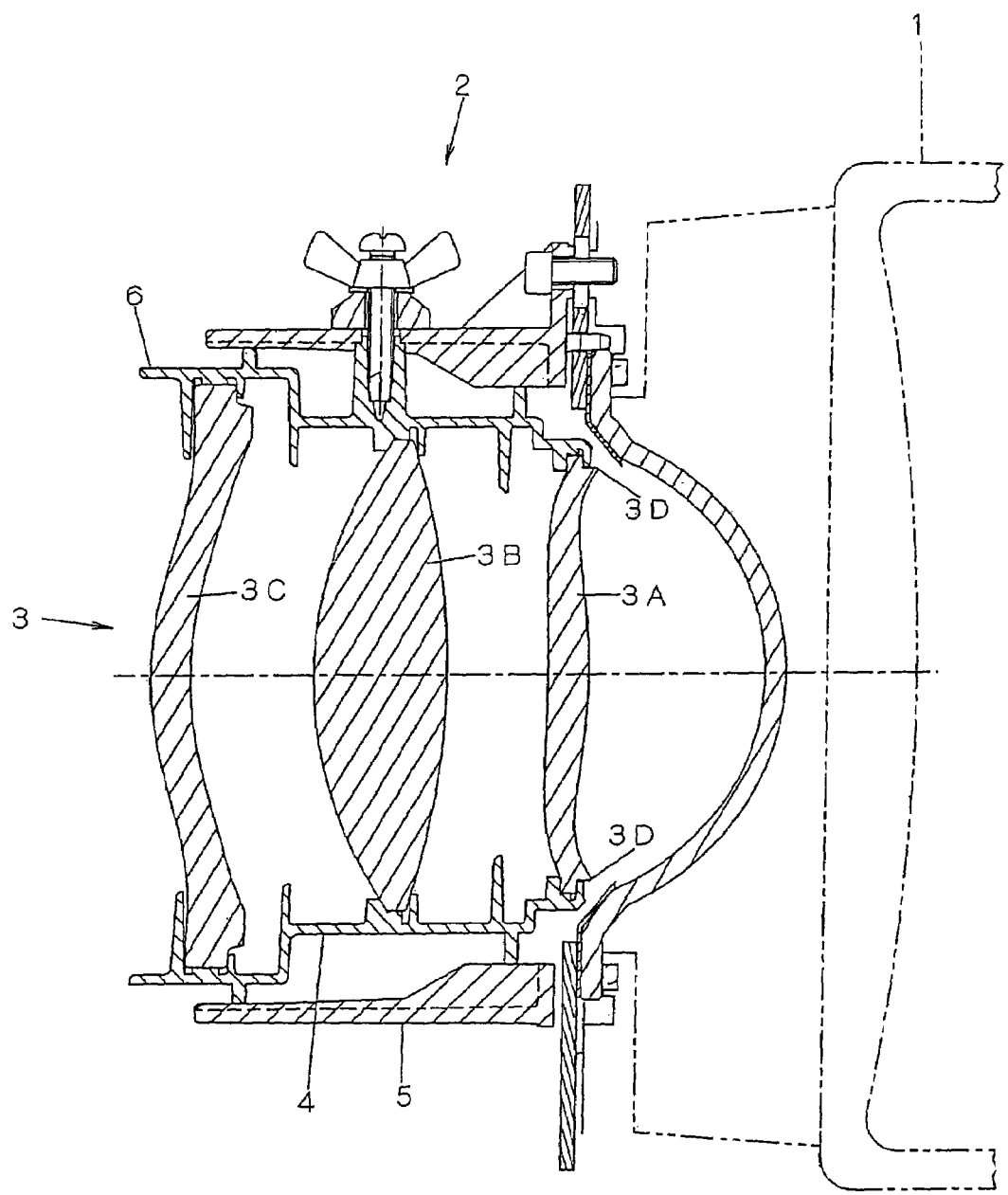
FIG. 2 is a side sectional view of a known projection lens unit.
Figure 3:
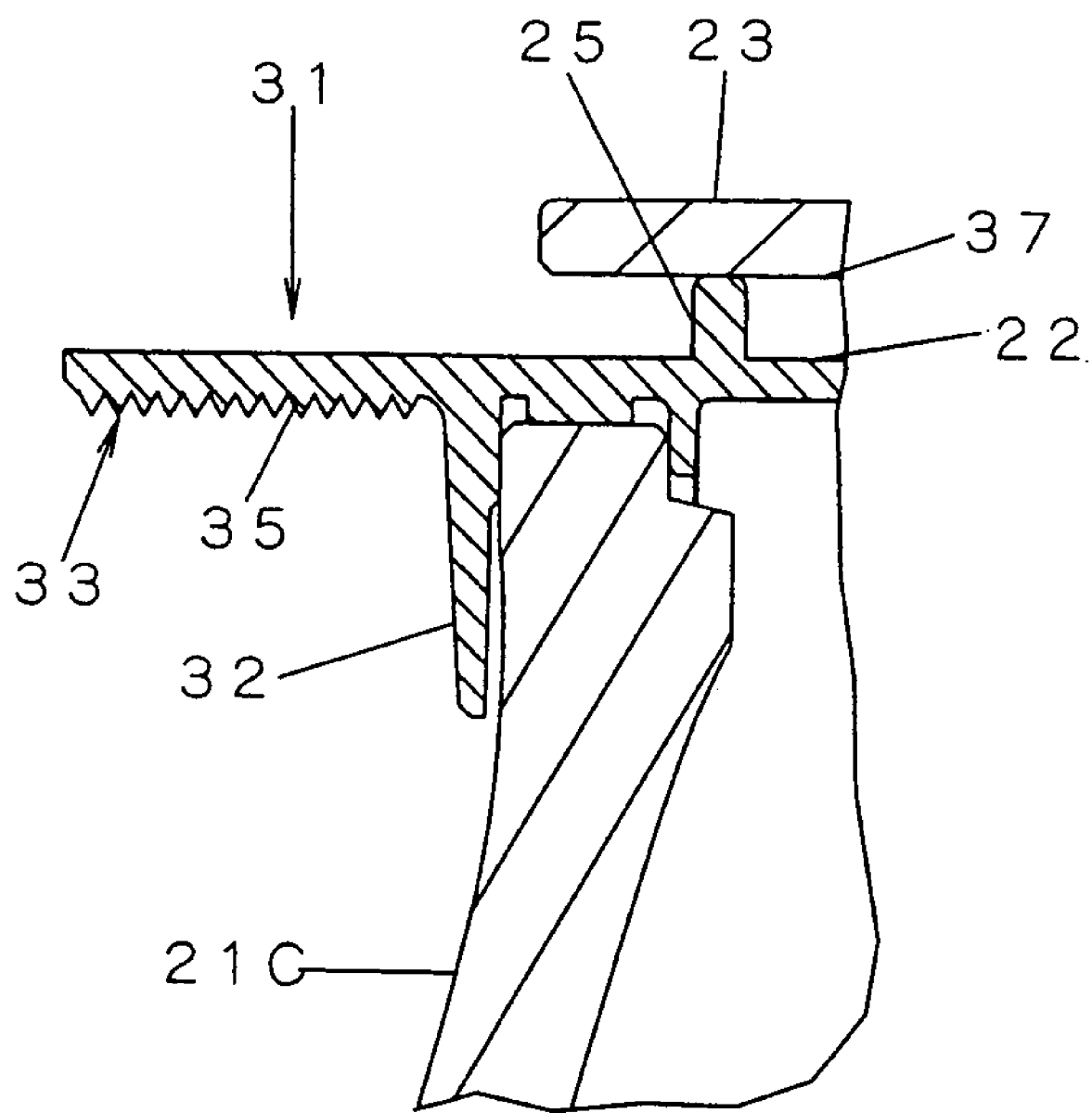
FIG. 3 is a magnified sectional view of a major part of a hood of the projection lens unit according to the embodiment of the present invention.

FIG. 1 is a side sectional view of the projection lens unit, and FIG. 3 is a magnified sectional view of a major part of a hood of the projection lens unit.

In a projector, as shown in FIG. 1, an image produced by a CRT 11 is magnified by a projection lens unit 12 and is projected onto a screen (not shown) via a reflective mirror (not shown) or directly.

The CRT 11 is an apparatus for producing an image. The front surface (the left side surface in FIG. 1) of the CRT 11 is formed so as to be flat and has a coupler 14 fixed thereto, which will be described later.

The projection lens unit 12 is a component for focusing and projecting an image produced by the CRT 11 onto the screen. The projection lens unit 12 is formed by the coupler 14 and a main body 15 of the lens unit 12.

The coupler 14 is a component for firmly fixing the main body 15 of the lens unit 12 to the CRT 11. The coupler 14 is formed by an outer cylinder 16, a concave element 17, and coolant 18. The outer cylinder 16 has an approximately cylindrical shape, and the base end (the right end shown in FIG. 1) of the outer cylinder 16 abuts against the rim of the front surface of the CRT 11. The base end of the outer cylinder 16 and the front surface of the CRT 11 are hermetically sealed each other. The outer cylinder 16 has a flange 19 disposed on the front thereof, serving as a pressing plate for firmly fixing the concave element 17.

The concave element 17 is a component for forming a concave lens together with the front surface of the CRT 11, the outer cylinder 16, and the coolant 18. The concave element 17 has a cross section having an approximately semicircular or semi-elliptical dented shape and has a light-shielding plate 17A disposed along the outside surface (the left side surface shown in FIG. 1) of the rim thereof. The light-shielding plate 17A is a component for allowing only image light emitted from the CRT 11 (light of a video projected on the front surface of the CRT 11) to pass therethrough and removing unnecessary light lying outside the image light. The light-shielding plate 17A is formed by a circular plate so as to cover the rim of the concave element 17 and is also composed of a black synthetic resin so as to absorb light. The inside rim of the light-shielding plate 17A extends inwards so as to cover the rim part of the image light emitted from the CRT 11 and incident on the main body 15 of the lens unit 12. With this structure, of light incident on the main body 15 of the lens unit 12, the light-shielding plate 17A removes unnecessary light lying outside the image light.

The coolant 18 is a liquid serving as a part of the concave lens of the coupler 14, for absorbing heat generated by the CRT 11. The coolant 18 is filled in a hermetically sealed space formed by the outer cylinder 16, the concave element 17, and the front surface of the CRT 11 so as to form the concave lens.

The main body 15 of the lens unit 12 is a component directly controlling light emitted from the CRT 11 so as to project an image produced by the CRT 11 onto the screen. The main body 15 of the lens unit 12 is formed by a lens 21, an inner lens barrel 22, and an outer lens barrel 23.

The lens 21 is a single concave or convex lens or a combination of a plurality of concave and/or convex lenses depending on its design. In the present embodiment, the lens 21 is a combination of three lenses consisting of an inside lens 21A, an intermediate lens 21B, and an outside lens 21C.

The inner lens barrel 22 is a component for accurately supporting each lens of the lens 21 so that each lens lies in accordance with its designed position. The inner lens barrel 22 has lens supports 24 disposed on the inner surface thereof at predetermined intervals so as to accurately support each lens of the lens 21 at respectively preset positions. Also, the inner lens barrel 22 has slidably contacting portions 25 disposed along the outer circumference thereof, which slidably contact with the inner surface of the outer lens barrel 23 when moving in and out the outer lens barrel 23 in a state of being supported by the outer lens barrel 23. The inner lens barrel 22 is supported by the outer lens barrel 23 with the slidably contacting portions 25 and is firmly fixed to the outer lens barrel 23 with a focus-lock screw 26. Thus, the inner lens barrel 22 can be detached from the outer lens barrel 23 simply by unscrewing the focus-lock screw 26 when it is to be replaced with a differently designed inner lens barrel. Also, by replacing the inner lens barrel 22 with one of a variety of differently designed inner lens barrels so as to be supported by the same outer lens barrel 23, in place of the main body 15 of the lens unit 12, one of a variety of differently designed of main bodies of the lens unit 12 can be fixed to the CRT 11. In addition, the inner lens barrel 22 has a nut portion 27, into which the focus-lock screw 26 is screwed, disposed on the outer circumference thereof and extending so as to come into contact with the inner circumferential surface of the outer lens barrel 23. The inner lens barrel 22 is supported only by the outer lens barrel 23 and does not come into contact with the coupler 14.

The inner lens barrel 22 has a hood 31 disposed to its screen-side end of the main body. The hood 31 is a component for defining the outermost boundary of a view angle stretching with respect to the center of the lens. The hood 31 is formed by a light-shielding plate 32 and a light-shielding barrel 33.

The light-shielding plate 32 is disposed along a plane orthogonal to the optical axis of the main body 15 of the lens unit 12 so as to exhibit a circular plate shape. The light-shielding plate 32 having a circular plate shape is disposed so as to cover the rim of the outside lens 21C from the outside of the outside lens 21C.

The light-shielding barrel 33 is disposed so as to extend from the screen-side end of the main body 15 of the lens unit 12 toward the screen. The light-shielding barrel 33 is formed so as to exhibit a circular cylindrical shape by outwardly extending a part of the inner lens barrel 22 supporting the outside lens 21C.

The front ends of the light-shielding plate 32 and the light-shielding barrel 33, that is, the inside end of the light-shielding plate 32 and the screen-side end of the light-shielding barrel 33, are formed along the outermost boundary of the view angle stretching with respect to the center of the lens. In other words, when the shielding height of the light-shielding plate 32 and the length of the light-shielding barrel 33 are respectively represented by H and L, the height H and the length L are set so as to satisfy the following expression (1), in relation to a view angle α:

$$\tan(\alpha/2) = H/L \qquad (1).$$

More particularly, these dimensions are set such that the ratio H/L lies in a range from 0.74 to 0.94. The specific value of the ratio H/L is set in accordance with a view angle α which varies depending on the type of the lens 21.

The hood 31 is composed of black synthetic resin so as to absorb light. As shown in FIG. 3, the light-shielding barrel 33 of the hood 31 has scattering grooves 35 formed on the inner surface thereof. The scattering grooves 35 are formed by V-shaped grooves circumferentially carved in the entire inner surface of the light-shielding barrel 33. The scattering grooves 35 are grooves for scattering unnecessary light thereat traveling outside the outermost boundary of the view angle stretching with respect to the center of the lens so as to remove the unnecessary light and also for enlarging an area for absorbing the unnecessary light therein. With this structure, the unnecessary light striking the inner surface of the light-shielding barrel 33 is first absorbed by the surface of the black synthetic resin, and the remaining part of the unnecessary light which is not absorbed and is reflected at the inner surface is scattered at the scattering grooves 35 and is thus removed.

As shown in FIG. 1, the outer lens barrel 23 is a component for accommodating and slidably supporting the inner lens barrel 22 in a state of being firmly fixed to the coupler 14. The outer lens barrel 23 has an inner-lens-barrel support 37 disposed on the inner surface thereof, slidably contacting with the slidably contacting portions 25 of the inner lens barrel 22. Thus, the inner lens barrel 22 is supported by the outer lens barrel 23 and is allowed to move in and out the outer lens barrel 23. The outer lens barrel 23 is firmly fixed to the coupler 14 having a leg portion 38 interposed therebetween.

OPERATION

In the projection lens unit 12 having the above-described structure, a ghost is removed as described below.

An image produced by the CRT 11 is magnified by the projection lens unit 12 and is expanded over the view angle α. The image expanded to the limit of the view angle α is projected onto the entire surface of the screen.

On this occasion, image light emitted from the CRT 11 and incident on the inner lens barrel 22 passes through the light-shielding plate 17A. Of the light incident on the inner lens barrel 22, unnecessary light lying outside the image light strikes the light-shielding plate 17A and is then removed, and only the image light is incident on the inner lens barrel 22.

In addition, of the image light emitted from the inner lens barrel 22, when there is unnecessary light lying outside the outermost boundary of the view angle α, the unnecessary light strikes the light-shielding plate 32 of the hood 31 and the light-shielding barrel 33. Part of the unnecessary light striking the light-shielding plate 32 is absorbed by the inside surface of the light-shielding plate 32, and the remaining part is reflected at the shielding plate 32 toward the inside of the inner lens barrel 22 and is removed. Part of the unnecessary light striking the light-shielding barrel 33 is absorbed by the inner surface of the light-shielding barrel 33, and the remaining part is scattered at the scattering grooves 35 and is removed.

EFFECTS OF THE EMBODIMENT OF THE INVENTION

As described above, unnecessary light lying outside image light emitted from the CRT 11 and incident on the inner lens barrel 22 can be removed by the light-shielding plate 17A. In addition, unnecessary light traveling outside the outermost boundary of the view angle a can be removed by the light-shielding plate 32 and the light-shielding barrel 33 of the hood 31, whereby a ghost is prevented from occurring on a screen, and a high-contrast and clear image is thus projected onto the screen. As a result, reliability of the projection lens unit 12 is improved.

OTHER EMBODIMENTS

Other Embodiment 1

Although the hood 31 is formed by the light-shielding plate 32 and the light-shielding barrel 33 in the foregoing embodiment, it may be formed by only one of the light-shielding plate 32 and the light-shielding barrel 33. By disposing one of the light-shielding plate 32 and the light-shielding barrel 33 along the outermost boundary of the view angle α, unnecessary light traveling outside the outermost boundary of the view angle α can be removed.

Although the light-shielding barrel 33 is formed of a simple cylinder in the foregoing embodiment, it may have an expandable structure formed by a plurality of cylinders so that its length L is adjustable. With this structure, even when the view angle a varies due to a change of design of the lens or the like, the light-shielding barrel 33 is effective.

Other Embodiment 2

Although the hood 31 has a circular structure in the foregoing embodiment, the hood 31 may be divided into a plurality of pieces and be disposed only in a region of the lens unit through which unnecessary light passes; in a wider region of the lens unit including the vicinity of the above region; or in the entire region including the above wider region. With this hood 31, unnecessary light traveling outside the outermost boundary of the view angle can be removed so as to prevent occurrence of a ghost.

Other Embodiment 3

Although the scattering grooves 35 are disposed only on the inner surface of the light-shielding barrel 33 of the hood 31 in the foregoing embodiment, grooves may be disposed only on the inside surface of the light-shielding plate 32 or on both the inside surface of the light-shielding plate 32 and the inner surface of the light-shielding barrel 33. In this case, the same effect as in the foregoing embodiment can be achieved.

Other Embodiment 4

Although unnecessary light is mainly scattered for removal by disposing the scattering grooves 35 on the inner surface of the light-shielding barrel 33 of the hood 31 in the foregoing embodiment, the unnecessary light may be absorbed or reflected for removal. In order to absorb the unnecessary light, the inside surface of the light-shielding plate 32 or the inner surface of the light-shielding barrel 33 is subjected to light-absorbent surface treatment such as delustering. In order to reflect the unnecessary light, the inside surface of the light-shielding plate 32 or the inner surface of the light-shielding barrel 33 is subjected to light-reflective surface treatment such as mirror finishing. In these cases, the same effect as in the foregoing embodiment can be achieved.

Other Embodiment 5

Although the projection lens unit 12 is used for a projector by way of example in the foregoing embodiment, it is not limited to application to the projector and is applicable to other optical apparatuses. In this case, the same effects as in the foregoing embodiment can be also achieved.

What is claimed is:

1. A projection lens unit comprising:
   a main body extending from an image receiving end to an image emitting end;
   at least one lens fixed within said main body and defining an optical axis, said one lens projecting an image outward from said main body through a viewing angle having a vertex at the center of said one lens; and
   a hood comprising a light-shielding barrel and an annular light-shielding plate;
   wherein said annular light-shielding plate extends radially inward from an inner surface of said main body so as to lie along a plane orthogonal to the optical axis;
   wherein said light-shielding barrel extends from said light-shielding plate to said image emitting end and serves to define an outermost boundary of the viewing angle; and
   wherein said annular light-shielding plate has a radial dimension H, said light-shielding barrel has a length L, parallel to the optical axis, and wherein H/L is within a range from 0.74 to 0.921.

2. The projection lens unit according to claim 1 wherein said annular light-shielding plate radially overlaps a peripheral portion of a second lens mounted within said main body, between said one lens and said image emitting end.

3. A projection lens unit comprising:
   a main body extending from an image receiving end to an image emitting end;
   at least one lens fixed within said main body and defining an optical axis, said one lens projecting an image outward from said main body through a viewing angle $\alpha$ having a vertex at the center of said one lens; and
   a hood comprising a light-shielding barrel and an annular light-shielding plate;
   wherein said annular light-shielding plate extends radially inward a distance H from an inner surface of said main body so as to lie along a plane orthogonal to the optical axis;
   wherein said light-shielding barrel extends a distance L from said light-shielding plate to said image emitting end and serves to define an outermost boundary of the viewing angle; and
   wherein $H/L = \tan(\alpha/2)$.

4. The projection lens unit according to claim 3, wherein the ratio H/L is within a range from 0.74 to 0.94.

* * * * *